United States Patent [19]

Driggers

[11] Patent Number: 4,620,662
[45] Date of Patent: Nov. 4, 1986

[54] TWO-POSITION SLEEVE BRAZING PROCESS

[75] Inventor: John M. Driggers, Pittsburgh, Pa.

[73] Assignee: Westinghouse Electric Corp., Pittsburgh, Pa.

[21] Appl. No.: 634,336

[22] Filed: Jul. 25, 1984

[51] Int. Cl.$^4$ ............................................. B23K 31/02
[52] U.S. Cl. .................... 228/227; 228/232; 228/126; 228/132; 228/183
[58] Field of Search .............. 228/163, 227, 126, 131, 228/132, 133, 119, 154, 173.2, 173.4, 183, 232, 229, 240, 242; 219/85 R, 85 M, 59.1, 67

[56] References Cited

U.S. PATENT DOCUMENTS

| | | | |
|---|---|---|---|
| 2,229,405 | 1/1941 | Currier | 228/227 |
| 2,938,993 | 5/1960 | Rudd | 219/67 |
| 3,571,908 | 3/1971 | Pillia | 228/232 |
| 3,962,767 | 6/1976 | Byerley | 228/119 |

Primary Examiner—Nicholas P. Godici
Assistant Examiner—K. Rowan
Attorney, Agent, or Firm—L. A. DePaul

[57] ABSTRACT

A process for brazing a sleeve within a tube which is resistant to longitudinal expansion is disclosed herein. In the first step of the process, a thermally induced radial expansion is induced in the tube in a first longitudinal section of the tube which does not include the ring of brazing alloy which circumscribes the sleeve. In the second step of the process, a brazing heat is applied across the longitudinal section of the tube which does include this ring of brazing material. The residual tensile stress created by the thermally induced radial expansion in the tube avoids the creation of gaps in the braze joint between the sleeve and the inner walls of the tube. This process is particularly useful in creating high-quality braze joints in sleeving operations in nuclear steam generators, where the heat exchange tubes which need to be sleeved may be partially or completely prevented from expanding in the longitudinal direction due to sludge deposits in the generator.

21 Claims, 7 Drawing Figures

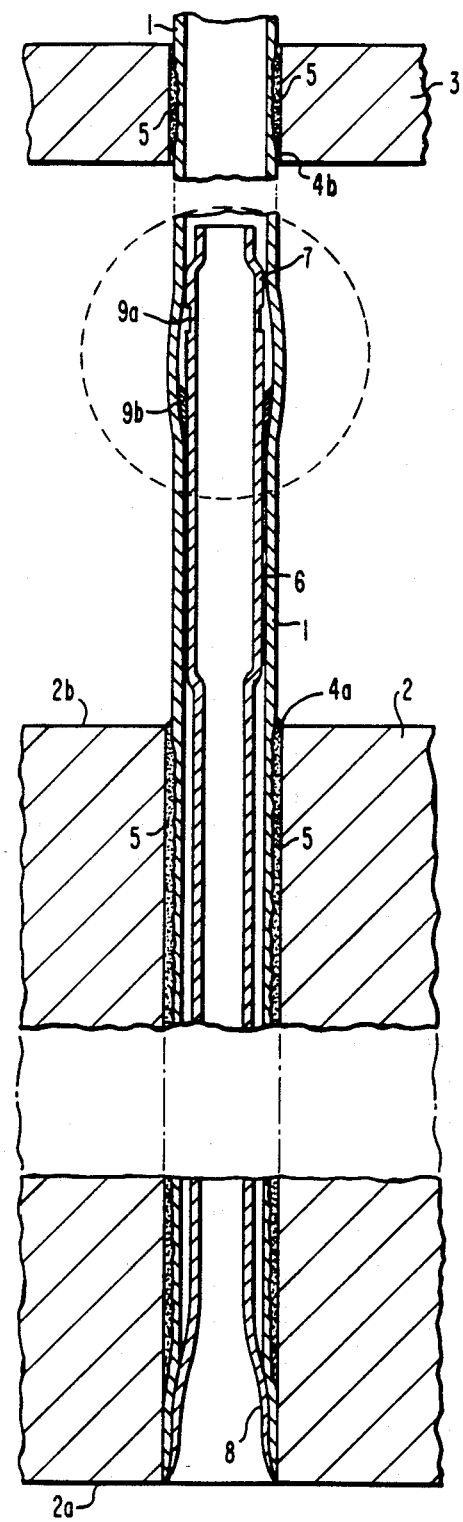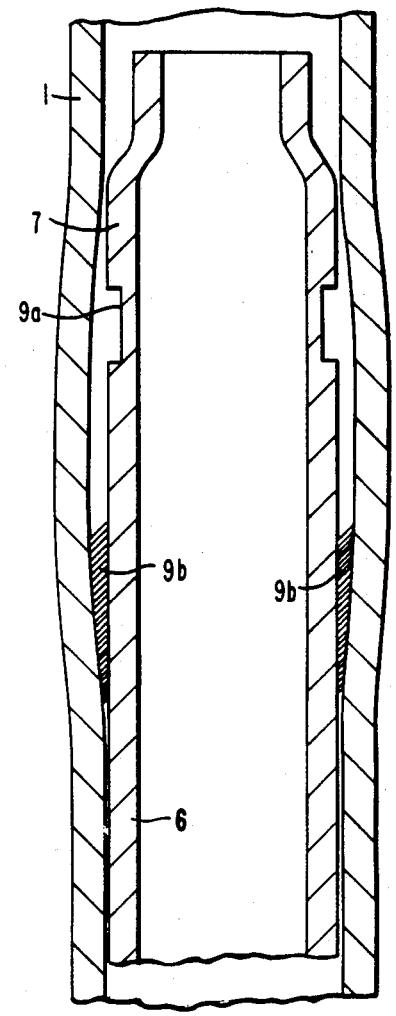
FIG. 1
FIG. 2

TWO-POSITION SLEEVE BRAZING PROCESS

BACKGROUND OF THE INVENTION

1. Field of the Invention

This invention relates to a two-step process for brazing sleeves into heat-exchange tubes which avoids the creation of undesirable gaps in the braze joint.

2. Description of the Prior Art

Processes for brazing sleeves within the heat exchange tubes of nuclear steam generators are known in the prior art. In such processes, a sleeve which is circumscribed by a ring of brazing alloy at one or both ends is slid across a section of the tube whose walls are in need of repair due to corrosion or denting. The end of the tube having the ring of brazing alloy is then typically hydraulically expanded so that it snugly engages the inner walls of the tube. In order to complete a watertight seal between the sleeve and the interior walls of the tube, a brazing heat is applied across the expanded end of the sleeve. The brazing alloy melts and forms a braze joint between the sleeve and the interior walls of the tube. Such sleeving operations are often performed in the longitudinal sections of the heat exchange tubes which extend through the openings in the tubesheet and support plates of the nuclear steam generator due to the tendency of the walls of these tubes to corrode and dent in these regions.

While the aforementioned one-step brazing process frequently results in watertight braze joints, problems may arise when sludge deposits become tightly wedged in the annular space between the walls of these tubes and the bores or other openings in the tubesheets and support plates through which these tubes extend. Under such circumstances, the sludge deposits may bind the outer walls of the tube so tightly against the walls of the bores in the tubesheets and support plates that the tubes are prevented from expanding longitudinally when the brazing heat is applied to the tube and sleeve. Consequently, these tubes will expand radially instead of longitudinally in the area where the brazing heat is applied. Such a radial expansion in the area of the braze joint creates undesirable gaps in the joint which may seriously jeopardize the integrity of the watertight seal the braze joint is intended to produce. Of course the extent to which such undesirable gapping occurs varies widely between any group of sleeved tubes due to the varying amount of binding forces the sludge deposits surrounding these tubes apply when a brazing heat causes them to expand. However, in those tubes where the sludge deposits apply a substantial amount of resistance to longitudinal tube expansions, the amount of gapping which occurs will, at the very least, significantly jeopardize the ability of the braze joint to create the intended watertight seal.

Accordingly, there is a need for a brazing process which is capable of reliably providing a watertight braze joint between a sleeve and a tube in a heat exchanger without seal-jeopardizing gaps. Moreover, it would be desirable if this process were capable of uniformly producing watertight braze joints between the sleeves and tubes of any steam generator regardless of variations in the extent to which sludge deposits resisted longitudinal movements in the tube when a brazing heat was applied thereto. Finally, it would be desirable if this process could be easily implemented with existing brazing tools.

SUMMARY OF THE INVENTION

In its broadest sense, the invention is a two-step process for creating a reduced-gap braze joint between a sleeve having a brazing region, and a tube which may radially expand when a brazing heat is applied across a longitudinal section thereof. In the first step of the process, heat is applied across a longitudinal section of the tube which does not surround the brazing region of the sleeve in order to thermally create a radial expansion in this first section of the tube. Next, a brazing heat is applied across a second section of the tube which surrounds at least in part the brazing region of the sleeve in order to braze the sleeve into the tube. The tensile stresses generated in the tube by the first heating step tend to balance out any radial expansion the tube undergoes at the site of the braze joint, thereby eliminating gaps between the sleeve and the tube in the braze joint. This process is particularly well suited for eliminating the gaps which sometimes occur when sleeves are brazed within sections of tubes in steam generators which are bound between tubesheets or support plates by sludge deposits and are capable of little or no longitudinal expansion when a brazing heat is applied thereon.

In the preferred embodiment, a heat source capable of applying a brazing heat across a selected longitudinal section of the tube is used to implement both steps in the inventive process. In the first step of the process, this heat source may be positioned across the first section of the tube until it attains the maximum amount of radial expansion possible with the particular power output of the heat source. When the tube is formed from a nickel-based alloy, such as Iconel, the heat source may be applied across the first section of the tube until it attains a temperature of about 980° C. or greater.

The sleeve may likewise be formed from Iconel, and the heat source may be applied to the second portion of the tube which circumscribes at least in part the brazing region of the sleeve until this section of the sleeve attains a temperature of 980° C. or greater. Moreover, the heat may be applied to the second section of the tube immediately after the first section of this tube has been heated. If desired, the tube may be preheated in more than one section before the final brazing step is carried out in order to further minimize the amount of gapping which may occur at the braze joint.

It should be noted that the process of the invention is capable of producing braze joints between sleeves and tubes characterized by little or no gapping regardless of the extent to which sludge deposits or denting binds the tubes in the bores of the tubesheets or support plates. The process is also well-suited for producing braze joints in tubes free from binding, and has resulted in joints of improved consistency in these tubes.

BRIEF DESCRIPTION OF THE SEVERAL FIGURES

FIG. 1 is a cross-sectional view of a sleeve which has been brazed across a section of a heat exchange tube in a nuclear steam generator by means of a prior art brazing process;

FIG. 2 is a detailed, cross-sectional view of the braze joint between the sleeve and tube illustrated in FIG. 1;

DETAILED DESCRIPTION OF THE PREFERRED EMBODIMENT

Figure 3:
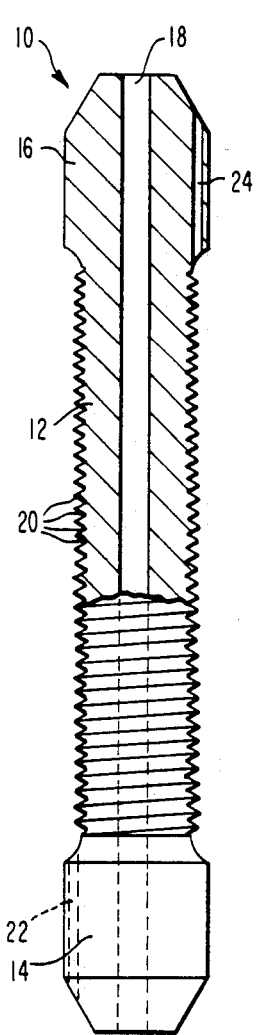
FIG. 3 is a partial, cross-sectional view of the mandrel of the heat source used to implement the process of the invention.

Purpose and Implementation of the Inventive Process

With reference now to the several figures, wherein like numerals represent like parts, FIGS. 1 and 2 represent how prior art brazing processes can create undesirable gaps in the braze joint between a heat exchange tube 1 in a nuclear steam generator, and a reinforcing sleeve 6. To fully understand why prior art brazing processes can create such gaps, some background concerning the structure and maintenance problems associated with nuclear steam generators is necessary.

Nuclear steam generators generally include a primary side through which hot, radioactive water from the reactor core is admitted into a plurality of heat-exchange tubes 1 which may be either U-shaped or straight. Such steam generators further include a primary side which houses and spaces these tubes 1 and circulates a flow of non-radioactive water therethrough so that non-radioactive steam may be generated from the heat output of the reactor core. A tubesheet 2 separates the primary side of the nuclear steam generator from the secondary side of the generator. In FIG. 1, the bottom surface 2a of the tubesheet 2 faces the primary side of the steam generator, while the top surface 2b faces the secondary side. The tubesheet 2 includes an array of bores 4a through which the heat-exchange tubes 1 extend. The mouths of these tubes 1 are substantially flush with the bottom surface 2a of the tubesheet 2 which faces the primary side of the nuclear steam generator. Furthermore, the outer walls of each of the mouths of the tubes 1 are expanded so that they flare out and engage the mouths of their respective bores as shown. The mounts of each of the tubes 1 are also welded to their respective bores 4a both to secure the tube 1 into the tubesheet 2, as well as to form a watertight seal between the tube 1 and its respective tubesheet bore 4a. However, past its flared mouth, the tube 1 often extends through the remainder of the tubesheet bore 4a with some amount of annular space between the outer surface of the tube 1, and the surface of the bore 4a. After the tube 1 extends past the upper surface 2b of the tubesheet 2, it passes through a bore 4b in one of several support plates 3. The bore 4b of the support plate 3 is somewhat larger than the outer diameter of the tube 1 so that there is also an annular space between the tube 1 and the bore 4b.

Over a period of time, corrosive sludge deposits 5 may begin to accumulate in the annular spaces between the outer surface of the tube 1 and the bores 4a and 4b in the tubesheet 2 and the support plates 3, respectively. These deposits may ultimately cause some corrosion in the outer walls of the tube 1, thereby making the outer surfaces of the tube 1 rough and weakened in these regions. Such corrosion may be exacerbated if the tube 1 vibrates against the walls of the bore 4b in the support plate 3, which can occur due to water currents present in the secondary side of the steam generator. The weakening of the walls of the tube 1 from the corrosion degradation caused by the sludge deposits 5 in the bores 4a and 4b and the denting from the tube vibrating in the support plate 3 may lead to a leak condition would could radioactively contaminate the non-radioactive water flowing around the outside surface of the tube 1 in the secondary side of the generator. To prevent such a leak condition from occurring, sleeves 6 are installed within the tube 1 across the weakened areas of the tube 1. When such a sleeve is used to repair the region of the tube 1 adjacent the tubesheet 2, the sleeve 6 typically includes a distal end 7 which is hydraulically expanded into contact with the inner walls of the tube 1 by means of a hydraulic expansion unit, and a proximal, rolled end 8 which is pressure-rolled into watertight engagement with the flared mouth of the tube 1 as illustrated. Such a sleeve 6 further includes a brazing reservoir 9a, around which an annular ring of brazing alloy 9b is seated. To complete the sleeving process, the expanded end 7 of the sleeve 6 is brazed against the inner walls of the tube 1 by means of a heat source which melts the brazing alloy 9b between the walls of the expanded end 7 of the sleeve 6 and the inner walls of the tube 1. Although not shown in FIG. 1, the region of the tube 1 surrounded by the support plate 3 may also be repaired by sleeving. However, the sleeves used to repair the region of the tube 1 surrounded by the support plate 3 include brazing reservoirs at either end, and are brazed at both ends to create the desired watertight seal between the sleeve and the tube 1. For a more complete description of the tube sleeving processes in general, see U.S. application Ser. No. 567,107, filed Dec. 30, 1983 and assigned to Westinghouse Electric Corporation, the entire specification of which is expressly incorporated herein by reference.

Unfortunately, the sludge deposits 5 can interfere with the production of a uniform, leakproof braze joint between the expanded ends 7 of the sleeve 6 and the inner walls of the tube 1. More specifically, it has been found that the sludge 5 which accumulates between the outer walls of the tube 1 and the bores 4a and 4b tends to lock these tubes so tightly in place that the longitudinal section of the tube 1 which surrounds the brazing region of the sleeve 6 (indicated by the dotted circle in FIG. 1) is prevented from expanding in the longitudinal direction when a brazing heat is applied across the reservoir 9a in the expanded end 7 of the sleeve 6. Consequently, the brazing heat will cause this longitudinal section of the tube 1 to expand radially, as may best be seen in FIG. 2. This radial expansion creates a gap between the walls of the expanded end 7 of the sleeve 6 and the inner wall of the tube 1, as indicated. This gap in turn causes the brazing alloy 9b to run out of the brazing reservoir 9a, and create a braze joint of non-uniform thickness between the sleeve 6 and the tube 1. If the gap is large enough, the brazing alloy 9b may run completely through the annular space between the expanded end 7 of the sleeve 6 and the inner walls of the tube 1, thereby failing entirely to create a braze joint between the sleeve 6 and the tube 1.

As will be described in detail hereinafter, the process of the invention reduces or eliminates the gap between the expanded end 7 of the sleeve 6 and the inner walls of the tube 1 by thermally expanding a different longitudinal section of the tube 1 through the sleeve 6 before a brazing heat is applied across the brazing reservoir 9a of the sleeve 6. In the preferred embodiment, the heating of the first longitudinal section of the tube 1 and the brazing reservoir 9a of the sleeve 6 is performed by shifting the heat source 10 from one specific position to another along the longitudinal axis of the tube 1 while continuously supplying power to the heat source 10. The residual tensile stress created by the thermally induced radial expansion in the tube tends to balance any further thermally induced compressive stress and related radial expansion in the brazing area of the sleeve 6. However, before the process of the invention is more specifically set forth, a description of the preferred heat source 10 used to implement this process will be given.

Figure 4:
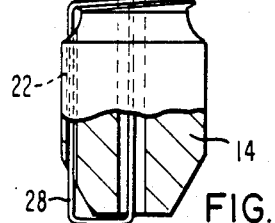
FIG. 4 is a partial, cross-sectional view of the heat source used in the preferred embodiment of the invention.

With reference now to FIGS. 3 and 4, the preferred heat source 10 is an electrical resistance-type heater including a generally cylindrical mandrel. This mandrel includes a center section 12, and a pair of enlarged diameter ends 14, 16. It should be noted at the outset that the enlarged ends 14, 16 render the heat source 10 particularly desirable in implementing the inventive process because they tend to confine the heating pattern of the electrical resistance-type heat source 10 to a relatively well-defined area which generally corresponds to the center section 12 of the mandrel. This feature in turn allows the user of the heat source 10 to selectively apply a brazing heat across a desired longitudinal section of the tube 1. The ends 14, 16 are preferably enlarged on their outer edges so as to facilitate the insertion of the heat source 10 into the mouth of the heat exchange tube 1. Finally, the mandrel of the heat source 10 includes an axially-extending bore 18 that is open at both ends.

The outer surface of the cylindrical section 12 of the heat source 10 has a plurality of helical grooves 20 over its entire length which receive the windings of the serially-connected heating coils 30, 30a, etc. These grooves 20 minimize any "hot spots" that might occur by uniformly spacing apart the individual windings of these heating coils over the entire center section 12 of the heat source mandrel. Additionally, the spacing between the adjacent windings provided by these helical grooves 20 prevents shorting, and permits a high power density in the groups of heating coils 30, 30a, etc. To further reduce the possibility of such aforementioned "hot spots" occurring in the center section 12 of the mandrel, the heating coils themselves are spaced apart as indicated.

Each of the enlarged ends 14, 16 of the mandrel are provided with a lengthwise-extending bore 22, 24. Preferably, the bore 22 in the end 14 is angularly spaced 180° from the bore 24 in end 16. Both the axially-extending bore 18 and the lengthwise-extending bores 22, 24 in the enlarged ends 14, 16 house the wiring of the heating coils 30, 30a, etc.

More specifically, the axial bore 18 houses a section of an electrical resistance wire 25 which is connected to one side of the serially-connected groups of heating coils. The wire section 25 includes a lead member 26 which is connected to a copper crimp connector 34. The wire section 25 and its lead member 26 are preferably twisted or braided for strength and for desirable thermal characteristics. However, at the point where the wire section 25 extends from the other end of the mandrel bore 18, the braiding is no longer needed and may stop. The wire section 25 is then bent back on itself in a generally U-shaped section 28, and is inserted through the bore 22 of enlarged end 14. It is then wound around the center section 12 of the heat source 10, with the individual windings of the wire seated in the helical recesses 20, as heretofore explained.

Adjacent the enlarged end 16 of the mandrel, the electrical resistance wire which forms the last of the heating coils 30, 30a, etc., is housed in the bore 24 of the enlarged end 16 of the mandrel, and extends out of the mandrel via lead member 32 at the same end as the other lead member 26, where it is connected to another copper crimp connector 36. A more detailed description of both the structure and materials used in fabricating the heat source 10 is set forth in U.S. patent applications Ser. Nos. 571,214 and 571,215, both filed on Jan. 16, 1984 and assigned to Westinghouse Electric Corporation.

Figure 5:
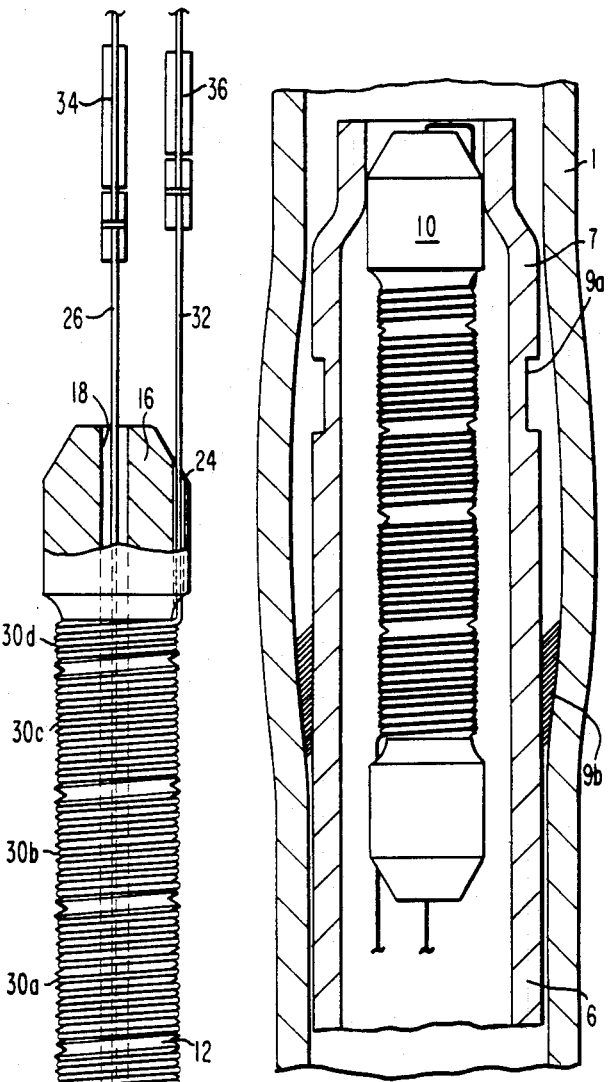
FIG. 5 is a cross-sectional view of this heat source as it appears in implementing a prior art process of brazing a sleeve to a tube.

FIG. 5 illustrates the operation of the heat source 10. After the distal end 7 of the sleeve 6 has been expanded within the tube 1 so that it snugly engages the inner walls of the tube 1, the heat source 10 is slid up into the sleeve 6 until the heating coils 30, 30a, etc., wound about the center portion 12 are equidistantly spaced around the ring of brazing alloy 9b in the brazing reservoir 9a. When the heating coils are energized, the expanded end 7 of the sleeve 6 is heated to a brazing temperature of approximately 980° C. or higher, and the brazing alloy 9b melts and forms a braze joint between the outside of the expanded end 7 and the inside walls of the tube 1.

While the heat source 10 illustrated in FIGS. 3 through 5 is the preferred means of implementing the claimed process due to the fact that the enlarged ends 14, 16 function to confine the heating pattern of the coils to a particular longitudinal section of the tube 1, it should be noted that the invention may be implemented by any heating means capable of applying a brazing heat to a selected longitudinal section of the tube 1.

Specific Description of the Preferred Embodiment of the Inventive Process

Figures 6, 7:
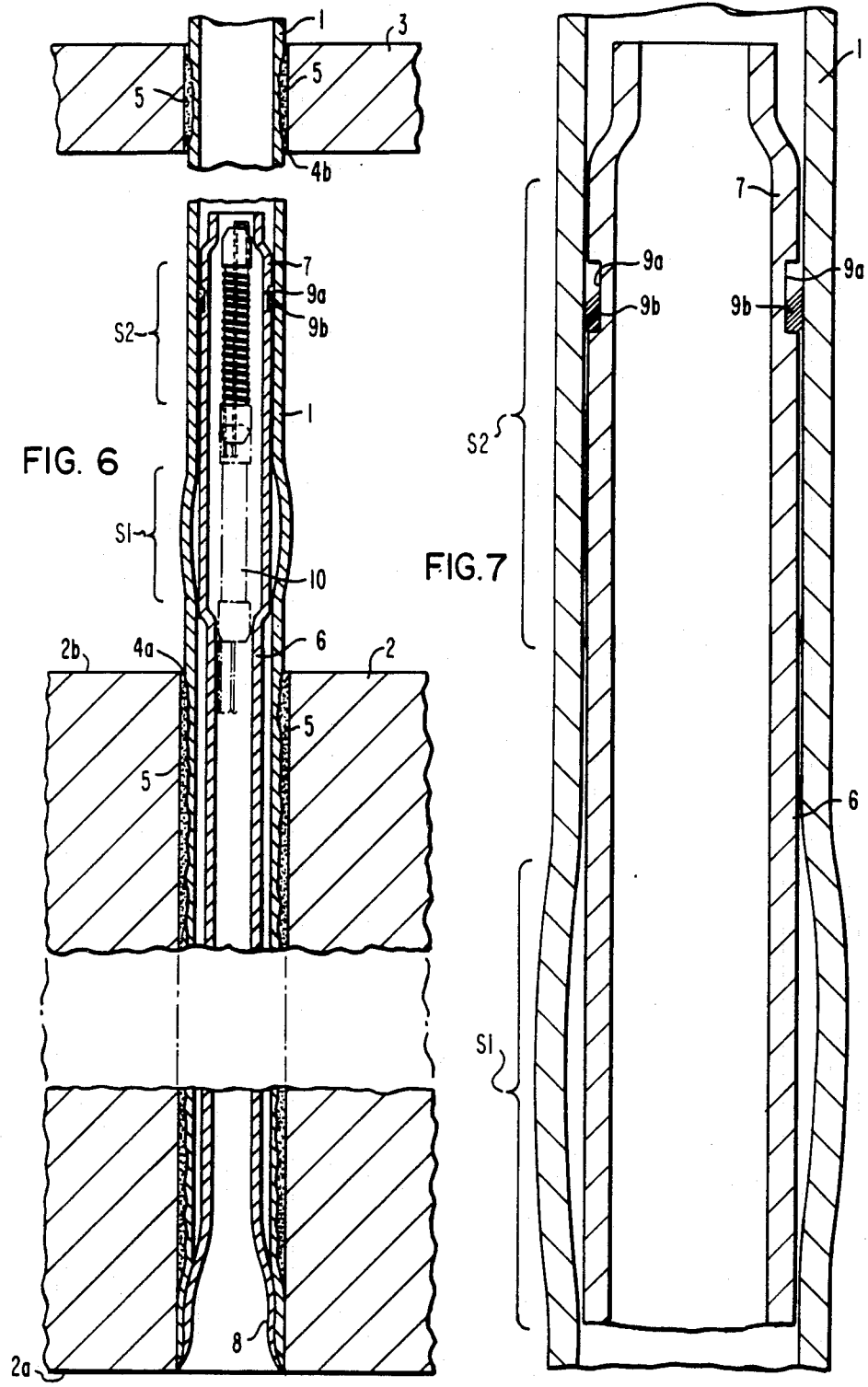
FIG. 6 is a cross-sectional view of this heat source implementing the process of the invention.
FIG. 7 is a detailed, cross-sectional view of the braze joint produced by the process of the invention.

FIG. 6 illustrates how heat source 10 may be used to implement the process of the invention. In the first step of the preferred process, the center line of heat source 10 is positioned between about 3.80 cm to 6.35 cm below the center line of the reservoir 9a of the sleeve 6, as indicated in phantom. The leads 34, 36 of the heat source 10 are connected to a source of electric power (not shown) in order that the heating coils 30, 30a, etc., located in the cylindrical center section 12 of the heat source 10 may generate radiant heat. Sufficient electrical power is passed through the leads 34, 36 to heat the longitudinal section S1 of the tube 1 and the sleeve 6 which surrounds the heat source 10 to a temperature of between about 980° C. and 1,150° C. The desired temperature should be obtained in from one to four minutes, depending on the capacity of the heater. Because the tube 10 is locked into place along its longitudinal axis by the sludge deposits 5 which have become wedged between the outer walls of the tube 1 and the walls of the bores 4a, 4b in the tubesheet 2 and support plate 3, respectively, the tube 1 will expand radially intstead of longitudinally in the section S1 which surrounds the heat source 10. This radial expansion of section S1 of the tube 1 may be more clearly seen in FIG. 7.

After the heat source 10 has thermally induced a radial expansion in the tube 1 as shown in FIGS. 6 and 7, the heat source 10 is next moved across the longitudinal section S2 of the tube 1 which includes the brazing region of the sleeve 6 indicated by a dotted circle in FIG. 6. In the preferred embodiment of the process, the heat source is shifted to the brazing region of the sleeve 6 while power is continuously applied to the coils of the heat source 10. However, in the alternative, the heat source could be de-actuated and the section S1 of the tube allowed to cool before the heat source 10 is shifted into the brazing region. In either event, the heat source 10 is again allowed to raise the temperature of the sleeve 6 and the tube 1 is section S2 to a brazing temperature of between about 980° C. and 1,150° C., which again should take place in about one to four minutes, depending on the power output of the heat source 10. Although the longitudinal section S2 of the tube 1 in the brazing region may still have a slight tendency to radially expand, the great majority of this radial expansion will be drawn up by the radial expansion created in the longitudinal section S1 of the tube 1. Applicant believes that the drawing-up of the radial expansion of the section S2 of the tube 1 by the expansion present in section S1 is due to residual tensile stresses which are created in the tube 1 after the initial heating step.

FIG. 7 illustrates the end result of the process of the invention. While the tube 1 includes a thermally induced, radial expansion in expansion S1, little or no radial expansion occurs in longitudinal section S2, which allows the brazing alloy 9b to melt in the small gap between the expanded end 7 of the sleeve 6 and the inner walls of the tube 1 A proper, watertight braze joint between the sleeve 6 and the tube 1 is thus created.

While the heat source 10 is placed below the longitudinal section S1 of the tube 1 during the initial heating step in the preferred embodiment, it should be noted that the process would also be operative if the heat source 10 were placed above the section S2 during this initial step. If desired, the tube 1 may be heated across more than one section before the final brazing step is carried out. Additionally, the process of the invention may be used to produce a prope braze joint between the sleeve 6 and the tube 1 regardless of whether the tube 1 is completely or only partially frozen from axial movement due to the accumulation of sludge deposits 5 in the annular recesses between the tube 1 and the bores 4a, 4b. The process will also be operable when the tube 1 is freely movable in the longitudinal direction within the bores 4a, 4b. Finally, experience has shown that the extent of flow and consistency of the braze joints resulting from multi-position heating is improved even for freely movable tubes, as compared to the braze joints obtained from single-position heating.

What is claimed is:

1. A process for brazing a sleeve within a tube with a heat source capable of applying heat across a selected longitudinal section thereof, having a brazing region comprising the sequential steps of first applying said heat source across a first longitudinal section of said tube which does not include said brazing region in order to form a radial expansion in said tube, and then applying said heat source across a second longitudinal section of said tube which includes at least in part said brazing region of said sleeve in order to braze said sleeve to said tube.

2. A process for brazing a sleeve within a tube in a longitudinal portion of said tube which expands radially when a brazing heat is applied thereto, wherein said sleeve includes at least one brazing region across its longitudinal axis, comprising the sequential steps of:
   (a) first applying a brazing heat across a section of said longitudinal portion of said tube which does not include any portion of said brazing region, and then
   (b) applying a brazing heat across a section of said sleeve which substantially includes said brazing region until said sleeve is brazed into said tube.

3. The process defined in claim 2, wherein said section of said longitudinal portion of said tube along which said brazing heat is initially applied includes a section of tube which surounds said sleeve.

4. The process defined in claim 3, wherein said brazing heat is generated by a heat source, and wherein said heat source is applied onto said section of said longitudinal portion of said tube long enough to maximize the amount of radial expansion that said source can produce in said section at a given power output.

5. The process defined in claim 4, wherein said tube and said sleeve are formed from an alloy containing iron, and said heat source is applied to said section of said longitudinal portion of said tube for between about one to four minutes.

6. The process defined in claim 4, wherein said tube and said sleeve are both formed from Inconel, and said heat source is applied to said section of said longitudinal portion of said tube until said tube attains a temperature of at least 980° C.

7. The process defined in claim 4, wherein said brazing region of said sleeve is circumscribed by a brazing reservoir which includes a brazing alloy.

8. The process defined in claim 4, wherein said brazig region of said sleeve frictionally engages the inner walls of said tube after said sleeve has been positioned within said tube.

9. A process for brazing a stainless steel sleeve having at least one brazing region within a stainless steel heat exchange tube having a longitudinal portion which radially expands when a brazing heat is applied across a longitudinal section of said portion, comprising the sequential steps of:
   (a) applying a brazing heat from a heat source across a first longitudinal section of said portion of said heat exchange tube which does not surround any part of said brazing region of said sleeve until said first longitudinal section is radially expanded by the heat from said heat source, and
   (b) applying a brazing heat from said heat source across a second longitudinal section of said portion of said heat exchange tube which surrounds said brazing region of said sleeve at least in part until said sleeve is brazed to said tube.

10. The process defined in claim 9, wherein said heat source raises the temperature of said first longitudinal section of said portion of said heat exchange tube to at least 980° C.

11. The process defined in claim 9, wherein said heat source generates a selected amount of heat output, and wherein said heat source is applied to said first longitudinal section of said portion of said tube until said section is thermally radially expanded to the maximum extent possible with said heat output.

12. The process defined in claim 9, wherein said source is applied to said first and second longitudinal sections of said portion of said tube for substantially the same amount of time.

13. The process in claim 9, wherein said heat source produces a temperature of between about 980° C. and 1,150° C. in said first and second longitudinal sections of said portion of said tube, and wherein said heat source is applied to said first and second longitudinal sections of said portion of said tube for between about one to four minutes.

14. The process defined in claim 9, wherein both said sleeve and said tube are formed from Inconel.

15. The process defined in claim 9, wherein said first longitudinal section of said tube surrounds at least a portion of said sleeve.

16. The process defined in claim 9, wherein said longitudinal portion of said tube extends between a tubesheet and a support plate in a steam generator.

17. The process defined in claim 9, wherein said longitudinal portion of said tube extends through a support plate in a steam generator.

18. A process for brazing a sleeve having a brazing region within a conduit with a heat source capable of applying heat across a selected longitudinal section thereof comprising the sequential steps of first applying said heat source across a first longitudinal section of said conduit which surrounds a section of said sleeve but does not include said brazing region in order to form a radial expansion in said conduit, and then applying said heat source across a second longitudinal section of said conduit which includes at least in part said brazing region of said sleeve in order to braze said sleeve to said conduit.

19. A process of brazing a sleeve having a brazing region within a conduit with a heat source capable of applying heat across a selected longitudinal section thereof, comprising the sequential steps of first applying said heat source across a first longitudinal section of said conduit which does not include said brazing region for a time period long enough to maximize the amount of radial expansion that said heat source can produce in said first longitudinal section at a given power output, and then applying said heat source across a second longitudinal section of said conduit which includes at least in part said brazing region of said sleeve in order to braze said sleeve to said conduit.

20. A process for brazing a sleeve having a brazing region within a tube with a heat source capable of applying heat around a selected longitudinal section thereof, comprising the sequential steps of first applying heat from said heat source around a first longitudinal section of said tube which does not include said brazing region of said sleeve in order to form a radial expansion in the tube, and then applying heat from the same heat source across a second longitudinal section of said tube which includes at least in part said brazing region of said sleeve in order to braze said sleeve to said tube.

21. A process for brazing a metallic sleeve concentrically disposed within a metallic tube, wherein said sleeve includes a brazing reservoir which includes a brazing alloy, comprising the sequential steps of:
(a) applying radiant heat from a heat source which is movable within said sleeve and tube around a first longitudinal section of the tube which does not surround any portion of the brazing reservoir of said sleeve until said first longitudinal section is radially expanded by the radiant heat;
(b) moving said heat source to a position adjacent to said brazing reservoir of said sleeve, and
(c) applying radiant heat from said heat source to said brazing reservoir of said sleeve until said brazing alloy melts and brazes said sleeve to said tube.

* * * * *